US010091556B1

(12) United States Patent
Liden et al.

(10) Patent No.: US 10,091,556 B1
(45) Date of Patent: Oct. 2, 2018

(54) RELATING ITEMS TO OBJECTS DETECTED IN MEDIA

(71) Applicant: IMDB.com, Inc., Seattle, WA (US)

(72) Inventors: Lars Hasso Liden, Seattle, WA (US); Rachel Jane MacTaggart, Bristol (GB); Ashutosh Vishwas Kulkarni, Bellevue, WA (US)

(73) Assignee: IMDB.COM, INC., Seattle, WA (US)

( * ) Notice: Subject to any disclaimer, the term of this patent is extended or adjusted under 35 U.S.C. 154(b) by 99 days.

(21) Appl. No.: 13/711,659

(22) Filed: Dec. 12, 2012

(51) Int. Cl.
*H04H 60/32* (2008.01)
*H04N 21/478* (2011.01)

(52) U.S. Cl.
CPC .............. *H04N 21/47815* (2013.01)

(58) Field of Classification Search
CPC .......... H04N 21/8166; H04N 21/4532; H04N 21/47815
USPC .............................................. 725/14, 34, 60
See application file for complete search history.

(56) References Cited

U.S. PATENT DOCUMENTS

| | | | | |
|---|---|---|---|---|
| 7,000,242 | B1 * | 2/2006 | Haber | 725/43 |
| 7,089,241 | B1 * | 8/2006 | Alspector et al. | |
| 8,095,597 | B2 * | 1/2012 | Rawat et al. | 709/206 |
| 8,234,561 | B1 * | 7/2012 | Bourdev | 715/224 |
| 8,392,288 | B1 * | 3/2013 | Miller | 705/26.81 |
| 8,589,984 | B1 * | 11/2013 | Acharya | H04N 21/2542 725/36 |
| 2002/0066050 | A1 * | 5/2002 | Lerman et al. | 714/6 |
| 2002/0069405 | A1 * | 6/2002 | Chapin et al. | 725/32 |
| 2005/0149910 | A1 * | 7/2005 | Prisament | 717/115 |
| 2006/0173750 | A1 * | 8/2006 | Naley et al. | 705/26 |
| 2006/0190481 | A1 * | 8/2006 | Alspector et al. | 707/103 R |
| 2006/0282332 | A1 * | 12/2006 | Pfleging et al. | 705/24 |
| 2006/0291695 | A1 * | 12/2006 | Lipton et al. | 382/103 |
| 2007/0127774 | A1 * | 6/2007 | Zhang et al. | 382/103 |
| 2007/0162258 | A1 * | 7/2007 | Lin et al. | 702/186 |
| 2008/0143689 | A1 * | 6/2008 | Foo et al. | 345/174 |
| 2008/0295129 | A1 * | 11/2008 | Laut | 725/34 |
| 2008/0298645 | A1 * | 12/2008 | Doi | 382/118 |
| 2009/0220149 | A1 * | 9/2009 | Menadeva et al. | 382/165 |
| 2009/0228920 | A1 * | 9/2009 | Tom et al. | 725/35 |
| 2010/0131385 | A1 * | 5/2010 | Harrang et al. | 705/26 |
| 2010/0278453 | A1 * | 11/2010 | King | 382/321 |
| 2011/0137753 | A1 * | 6/2011 | Moehrle | 705/27.1 |
| 2011/0138326 | A1 * | 6/2011 | Roberts et al. | 715/808 |
| 2011/0157067 | A1 * | 6/2011 | Wagner et al. | 345/174 |
| 2011/0283189 | A1 * | 11/2011 | McCarty | 715/707 |
| 2011/0295988 | A1 * | 12/2011 | Le Jouan | 709/223 |

(Continued)

*Primary Examiner* — Michael B Pierorazio
(74) *Attorney, Agent, or Firm* — Thomas | Horstemeyer, LLP

(57) ABSTRACT

Disclosed are various embodiments for relating items to objects detected in media. An item recognition application obtains media information associated with a broadcast being consumed form the client device. The item recognition application identifies objects in the media based on user input of the location of the object on the client device display and/or heuristic detection of the object. The user may indicate the object's location through an input device. The object may be heuristically detected based on an algorithm that differentiates the object from the background. The item recognition application identifies items related to the object. The item recognition application then performs an action with the item.

28 Claims, 9 Drawing Sheets

(56) References Cited

U.S. PATENT DOCUMENTS

2012/0079049 A1* 3/2012 Rawat et al. .................. 709/206
2012/0084811 A1* 4/2012 Thompson et al. ............ 725/34
2013/0086465 A1* 4/2013 Boudville ..................... 715/234

* cited by examiner

RELATING ITEMS TO OBJECTS DETECTED IN MEDIA

BACKGROUND

Individuals often view media broadcasts. These media broadcasts often depict objects of interest to the individuals. Unfortunately, individuals may spend significant time researching the objects to find similar items. Others may not be able to determine what items have already been identified as related to the objects seen in media broadcasts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Individuals often view media broadcasts. Media broadcasts depict many objects in which the viewer may be interested. For example, a movie or television show may depict an actress wearing a certain dress that appeals to the viewer. Broadcasts may also be television shows, commercials, or other forms of video. Objects may be anything seen in the broadcast, such as, for example, jewelry, furniture, vehicles, items available for purchase, buildings, landmarks, physical structures, geographical locations, or other articles. Also, there may be many items related to the object that may be of interest to the viewer. For instance, the viewer may be interested in dresses similar to the exact dress shown in the movie. Or, in the case of a dog seen in the broadcast, the viewer may be interested in collars, dog food, or other items related to dogs. The viewer may wish to learn more about the objects depicted in media, purchase items related to the object, or perform other actions upon seeing the objects. For example, the viewer may seek to learn about the fabric content of the dress or the viewer may wish to add the dress to an electronic wish list. The viewer may be interested to obtain discount mechanisms associated with the object. For instance, the viewer may wish to find coupons for a tourist attraction depicted in a movie.

To assist in performing actions with objects observed while viewing media broadcasts, individuals may appreciate recognition of the objects and items related to the objects. Once the objects and related items have been recognized, actions may be performed with the object and related items. Actions may include, for example, purchasing items that match or are related to the objects in media, viewing item detail pages introducing the individual to items related to the object, suggesting items related to the object, or otherwise interacting with items related to objects seen in media. Moreover, individuals may appreciate viewing indicators associated with the objects while viewing the media broadcasts.

To generate object indicators, various embodiments of the present disclosure enable detecting the objects based on user input of coordinates of the object, automatic detection by masking everything in the media frame except for the object, and other ways of isolating the location of the objects in the media frame. Once the location of an object has been determined, the present disclosure enables generating an indicator of the object at that location. Then, a user may select the object while viewing the media to perform various actions.

In the following discussion, a general description of the system and its components is provided, followed by a discussion of the operation of the same.

Figure 1:
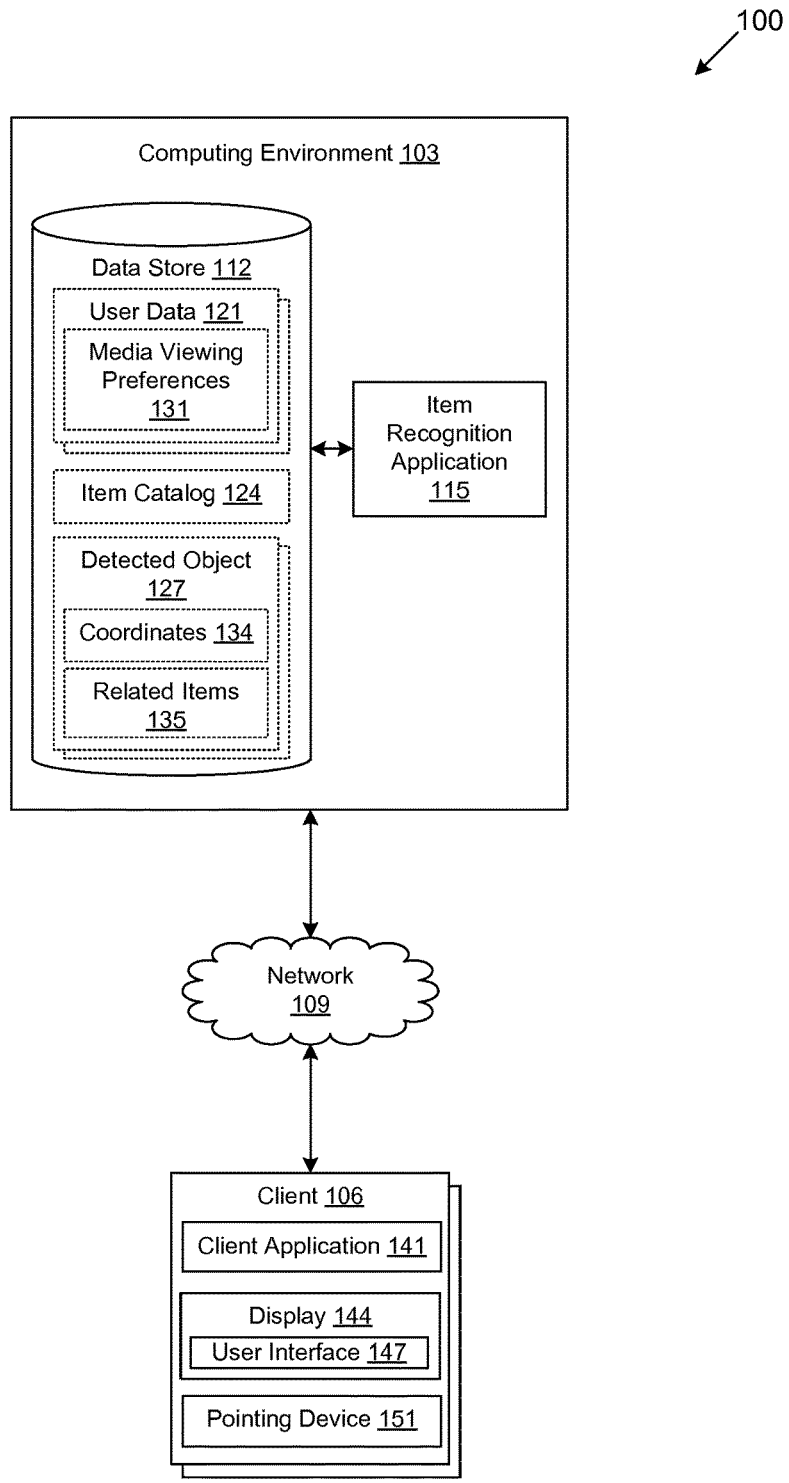
FIG. 1 is a drawing of a networked environment according to various embodiments of the present disclosure.

With reference to FIG. 1, shown is a networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include the item recognition application 115, and other applications, services, processes, systems, engines, or functionality not discussed in detail herein. The item recognition application 115 is executed to detect objects in media and identify items related to the objects. Embodiments of the item recognition application 115 may be executed to detect object locations in media through user input of the coordinates of the object, automatic detection by masking the background, or using some other approach. One embodiment of the item recognition application 115 may associate the objects with items in the item catalog 124 or other sources. Various embodiments of the item recognition application 115 may perform certain actions with the items related to the object, and other functions relevant to identifying items related to objects detected in media.

The data stored in the data store 112 includes, for example, user data 121, item catalog 124 data, detected object 127 data, and potentially other data. The user data 121 may include various data related to a user of the item recognition application 115. For example, user data 121 may include media viewing preferences 131, media viewing history, or other data related to viewing media and learning about objects depicted in the media. Media viewing preferences 131 may include, for example, whether to highlight objects with indicators while viewing media or whether to pause viewing media when an object is selected. Media viewing preferences 131 may also comprise what action to take when the object is selected. Many actions may be taken. For example, the viewer may wish to purchase an item related to the object. Additionally, the viewer may wish to facilitate identifying the item through an item search or other action or to learn more about items related to the object through item detail pages. Moreover, the viewer may prefer to be presented with available actions upon selection of the object. Another example of an action may be to gain incentives for providing input identifying the object in the media or items related to the object.

The item catalog 124 contains various data regarding items in a catalog. Such items may correspond to products, goods, services, downloads, and so on, which may be offered for order by one or more merchants by way of an electronic commerce system. The various data regarding each item may include name, description, price, genre, subgenre, categories, images, videos, tax categories, options, shipping categories, and so on.

Each detected object 127 includes various parameters associated with objects seen in media, such as movies, advertisements, videos, programs, etc. This data may comprise, for example, coordinates 134 of the objects as depicted in media. The detected object 127 data may contain related items 135 indicating items in the item catalog 124 and other sources of items that are related to the detected object 127. The detected object 127 data may include other data useful for the item recognition application 115.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 144. The display 144 may comprise, for example, one or more devices such as liquid crystal display (LCD) displays, gas plasma-based flat panel displays, organic light emitting diode (OLED) displays, LCD projectors, or other types of display devices, etc. The display 144 may be capable of receiving input through the user's touch on the screen.

The client 106 may be configured to execute various applications such as a client application 141 and/or other applications. The client application 141 may be executed in a client 106, for example, to access network content served up by the computing environment 103 and/or other servers, thereby rendering a user interface 147 on the display 144. To this end, the client application 141 may comprise, for example, a browser, a dedicated application, etc., and the user interface 147 may comprise a network page, an application screen, etc. The client 106 may be configured to execute applications beyond the client application 141 such as, for example, email applications, social networking applications, word processors, spreadsheets, and/or other applications.

Next, a general description of the operation of the various components of the networked environment 100 is provided. To begin, users at the client 106 may view media on the display 144. A user may wish to purchase an item depicted in the media. While viewing media, the item recognition application 115 may allow the user to interact with objects depicted in the media by providing inputs of the location of the object on the display. The user may use a pointing device 151, touch the display 144, position a cursor, or otherwise select one of the objects.

After the location of an object depicted in a media broadcast is known, the item recognition application 115 may create object indicators to highlight the location of the object in the media. This may be done by adding object indicators to the media itself, an overlay user interface 147, or other ways of indicating the object may be selected. For example, a frame or highlighter may be created around the border of an object. The highlighter may be generated at least in part by the item recognition application 115 as part of a user interface 147 and sent to a client 106 for display or the indicator may be sent to a client for rendering a highlight in the media. To assist the item recognition application 115 with generating the object indicators, the user may use a pointing device 151, touch the display 144, or otherwise provide input indicating the coordinates of the object in the media. The coordinates may also be automatically detected, for example by masking algorithms. These coordinates may be stored as coordinates 134 in the data store 112 or may be detected as needed.

Once the user has selected an object, the item recognition application 115 may determine which action to take based on media viewing preferences 131 or other indicators. The action may be to initiate a search of the item catalog 124 or other source for items that may be related to the object. The user may then identify an item in the search results that the item recognition application 115 will store as a related item 135. The item recognition application 115 may initiate a purchase transaction of an item or items related to the object. The item recognition application 115 may initiate generation of a user interface 147 depicting details about related items 135. In addition, there may be other actions the items recognition application 115 may take upon user selection of an object depicted in media.

As a non-limiting example, using a touch screen device, a user may view a movie depicting a man wearing a BrandA suit. The user may seek to learn more about the suit. Assume that, before viewing the movie, the user had set a media viewing preference 131 to display more information about items viewed in media upon selection of a given object. The user may indicate the presence of the suit in the movie by touching a touch screen at the location of the suit and following it as it is depicted in various locations in several frames of the movie. By doing this, the user inputs coordinates corresponding to the location of the suit in the movie. The item recognition application 115 may obtain these coordinates and store them in the data store as coordinates 134. The item recognition application 115 may create an object indicator by generating an overlay user interface 147 outlining the suit at these coordinates 134. To this end, the coordinates provided can assist the item recognition application 115 in generating an overlay user interface 147.

In various embodiments, the item recognition application 115 may have automatically detected the suit by using a background masking algorithm, such as, for example, by doing Canny edge detection and creating a pixel mask of the background. The item recognition application 115 may also or instead perform a face and skin masking algorithm, such as, for example, by converting the image into a Hue, Saturation, Value (HSV) model and applying predetermined thresholds to identify skin and hair tones and creating a pixel mask of the hair and skin of the actor wearing the suit. Knowing where the background and skin are located aids in recognizing the object. Thus, in the example, the suit indicator may have been generated based on automatic masking of the person's skin and/or the background in place of or in addition to the user's input of the coordinates.

Continuing the non-limiting example, once the user has selected the suit, the item recognition application 115 may initiate generation of a user interface 147 displaying information about the suit, perhaps based on the item catalog 124, since the user had set the media viewing preferences 131 to provide more information about objects that are selected while viewing media. In various embodiments, the item recognition application 115 may initiate purchase of the suit for the user, initiate conducting a search for suits, or other action concerning items related to the suit object depicted in the movie. In initiating a purchase of a suit, the item recognition application 115 may send a message to an electronic commerce system to make the purchase without any additional input from the user. The item recognition application 115 may take many actions upon selection of an object. For example, the item recognition application 115 may initiate purchase and also send a message to an incentive system for providing the user with a reward for providing input as to the location of the actor wearing the suit.

Figure 2A:
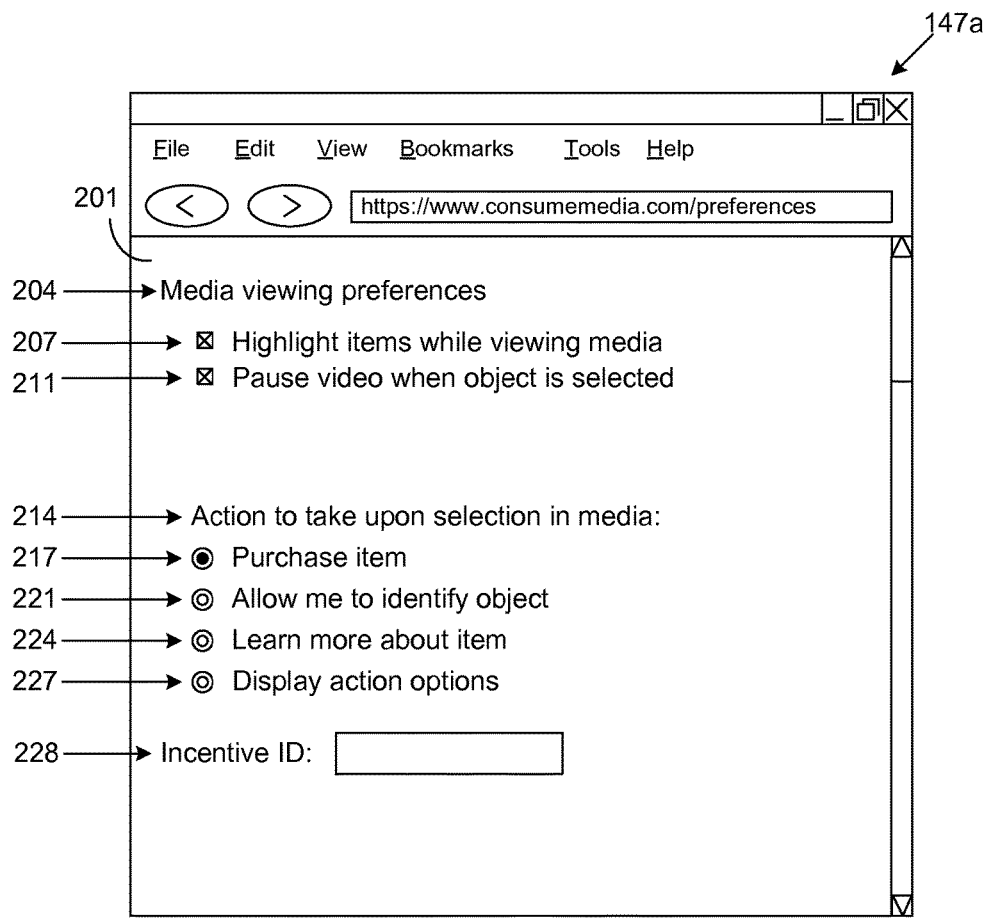
FIGS. 2A, 2B, 2C, 2D, and 2E are drawings of examples of a user interface rendered by a client in the networked environment of FIG. 1 according to various embodiments of the present disclosure.

Referring next to FIG. 2A, shown is one example of a user interface 147, denoted herein as a user interface 147a, rendered by a client application 141 (FIG. 1) executed in a client 106 (FIG. 1) in the networked environment 100 (FIG. 1). The user interface 147a includes a media viewing preferences network page 201 that obtains user media viewing preferences 204. These preferences may include whether to highlight objects with object indicators while viewing media 207 and whether to pause video when an object is selected 211. Furthermore, the media viewing preferences 204 may include actions 214 to take upon selection of an object depicted in the media. Actions 214 may comprise purchasing 217 an item related to the object, identifying 221 an item related to the object, learning more about the item 224, slowing replay of the video when the user is indicating the location of the object, or other actions. These preferences may be obtained prior to viewing the media. Alternatively, the user may be presented with a display of action options 227 to choose an action while viewing the media. Another media viewing preference 204 may include whether to receive incentives for providing input regarding the location of objects in the media broadcast and/or items related to the objects. To this end, the user may input an incentive identification 228 to receive rewards for providing input.

Figure 2B:
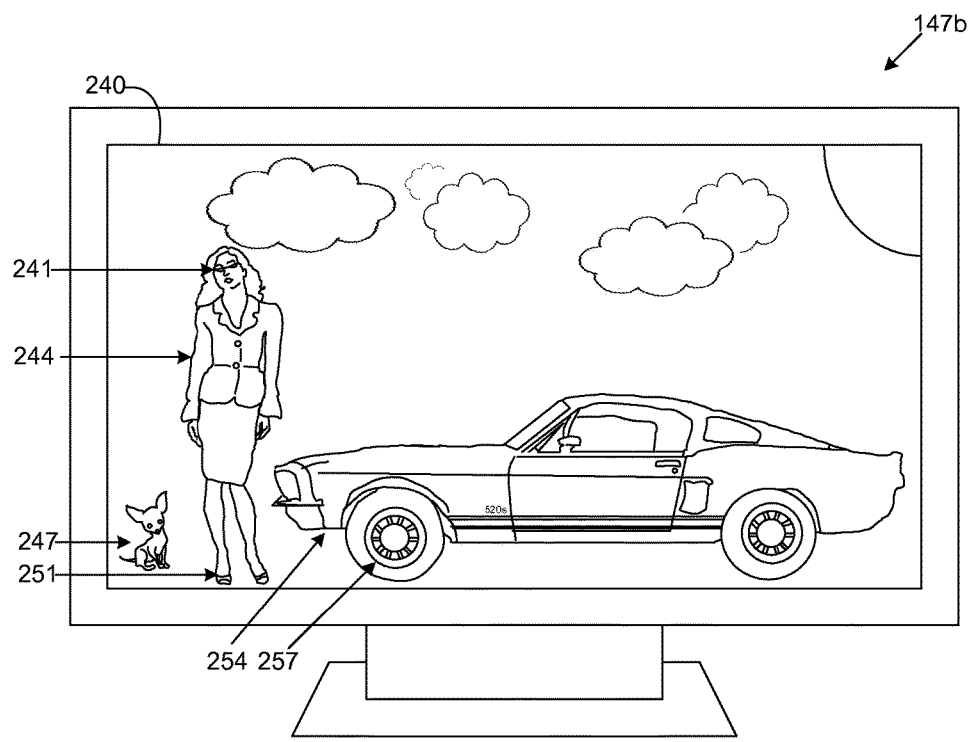

Turning now to FIG. 2B, shown is one example of a user interface 147, denoted herein as user interface 147b, rendered by a client application 141 (FIG. 1) executed in a client 106 (FIG. 1) in the networked environment 100 (FIG. 1) according to an embodiment of the present disclosure. The user interface 147b includes a network media frame page 240 that depicts, for example, a scene from a movie. The network media frame page 240 depicts several objects, including sunglasses 241, a jacket 244, a dog 247, shoes 251, a car 254, and car rims 257. Each of these objects may be of interest to a viewer. Thus, the item recognition application 115 may interact with this page as will be described below.

Figure 2C:
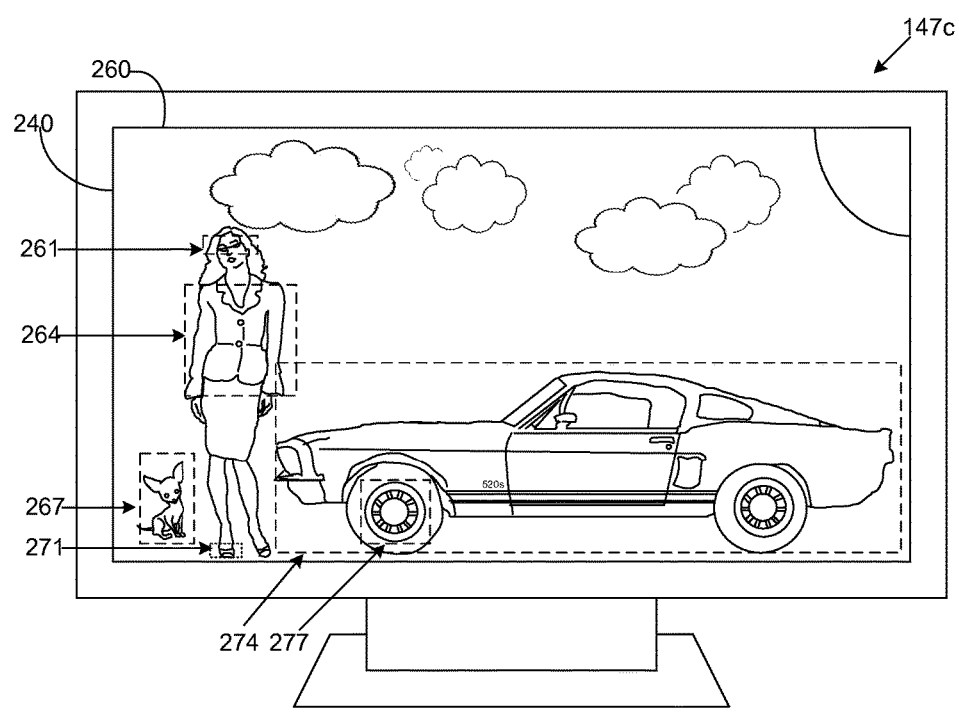

Moving on to FIG. 2C, shown is one example of a user interface 147, denoted herein as user interface 147c, rendered by a client application 141 (FIG. 1) executed in a client 106 (FIG. 1) in the networked environment 100 (FIG. 1) according to one embodiment of the present disclosure. The user interface 147c depicts the network media frame page 240 that includes a scene from a movie shown in FIG. 2B, but it also includes an overlay user interface 260 generated in part by the item recognition application 115 (FIG. 1) highlighting the objects based on object indicators. The overlay user interface 260 includes, for example, a sunglasses highlighter 261, jacket highlighter 264, dog highlighter 267, shoes highlighter 271, car highlighter 274, and car rims highlighter 277. These indicators may have been generated based on a masking algorithm, user input of the coordinates of the objects, or other ways of detecting objects in a frame from a movie depicted on a display 144. There may be more objects not yet highlighted by the item recognition application 115. In various embodiments, the highlighting of the objects may have been generated by a client application 141 (FIG. 1) based on indicators sent to it by the item recognition application 115.

For example, the item recognition application 115 may have obtained a user's identification of the coordinates of the sunglasses 241 (FIG. 2) as a result of the user pointing to the object by clicking a pointing device 151 (FIG. 1) at the sunglasses 241 location. Using these coordinates, the item recognition application 115 may generate the sunglasses highlighter 261. In various embodiments, the highlighters may be integrated into the network media frame page 240, generated as an overlay user interface 260, as depicted, and/or created in another way that highlights the objects. Furthermore, the highlighters may be depicted as a flashing outline of the object, dimming the area around the object, changing the color of the object, and/or in another way that indicates the object is being highlighted.

Figure 2D:
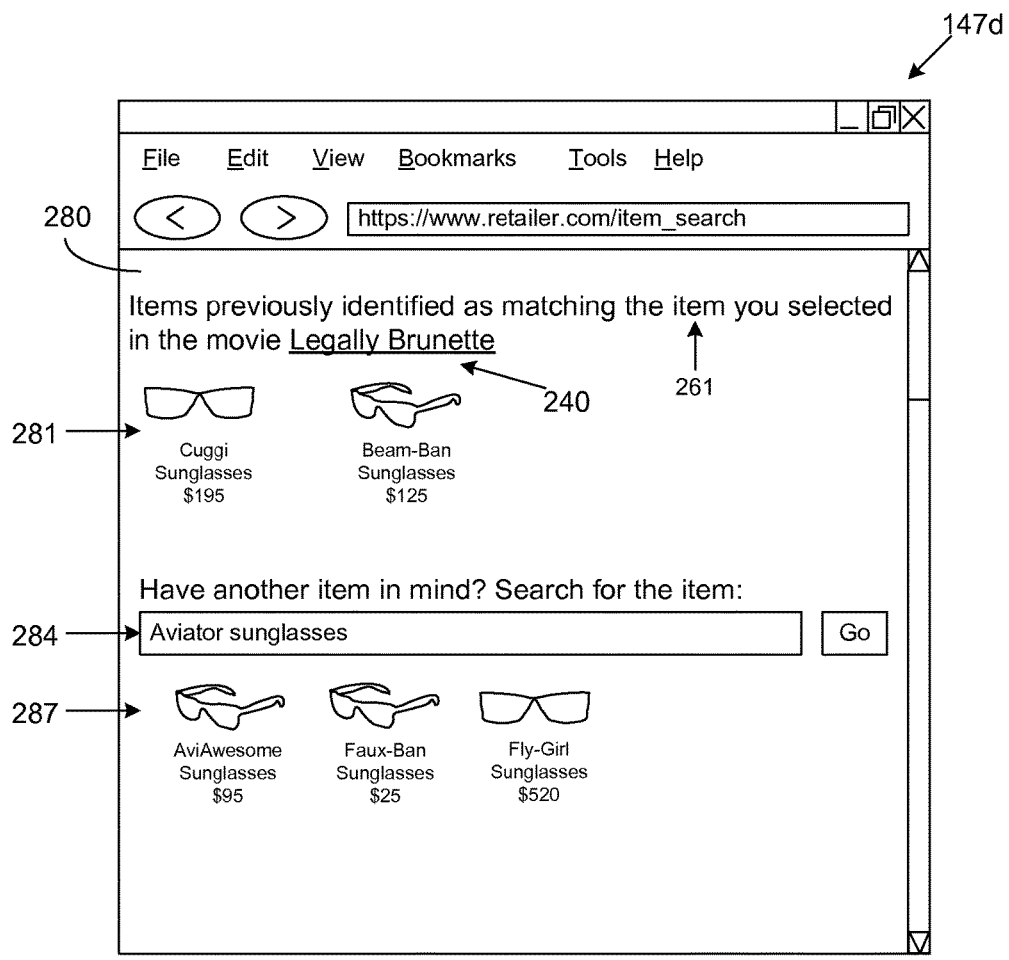

Referring next to FIG. 2D, shown is one example of a user interface 147, denoted herein as user interface 147d, rendered by a client application 141 (FIG. 1) executed in a client 106 (FIG. 1) in the networked environment 100 (FIG. 1) according to one embodiment of the present disclosure. The user interface 147d depicts a related items network page 280 generated in part by the item recognition application 115 (FIG. 1). Here, the user has selected the sunglasses highlighter 261 (FIG. 2C) and a related items network page 280 has been displayed because the user's media viewing preferences 131 (FIG. 1) indicated that the user sought to see related items and search for items related to the sunglasses object 241 (FIG. 2B) upon selection of that object's highlighter. In various embodiments, other actions may be taken, such as, for example, initiating an item purchase, viewing an item detail page, or other action relevant to objects seen in media.

The related items 281 were identified by the item recognition application 115 based at least partly on the related items 135 (FIG. 1) in the data store 112 (FIG. 1), potentially in addition to other sources of items related to the sunglasses object 241 (FIG. 1). The related items 135 may have been previously identified by other users, automatically identified by the item recognition application 115, and/or otherwise related to the sunglasses object 241. Furthermore, user interface 147d includes a search box 284 for the user to search an item catalog 124 (FIG. 1) and returned items 287 for the user's search for "aviator sunglasses." Although this example returned items of the same type as the object, other items that differ from the object may be returned that are related to the object in some way. For example, had the user selected the dog object 267 (FIG. 2C), the related items 135 may have included collars, leashes, dog food, or other items related to dogs. Moreover, the items may represent a variety of subcategories related to the object. For example, the sunglasses in the movie may actually have been a high end brand, like Cuggi as depicted in the related items 281, but the user may appreciate items in other price ranges, like the AviAwesome sunglasses in items 287. Thus, the related item may be the exact object depicted in the broadcast media or other relevant items.

Figure 2E:
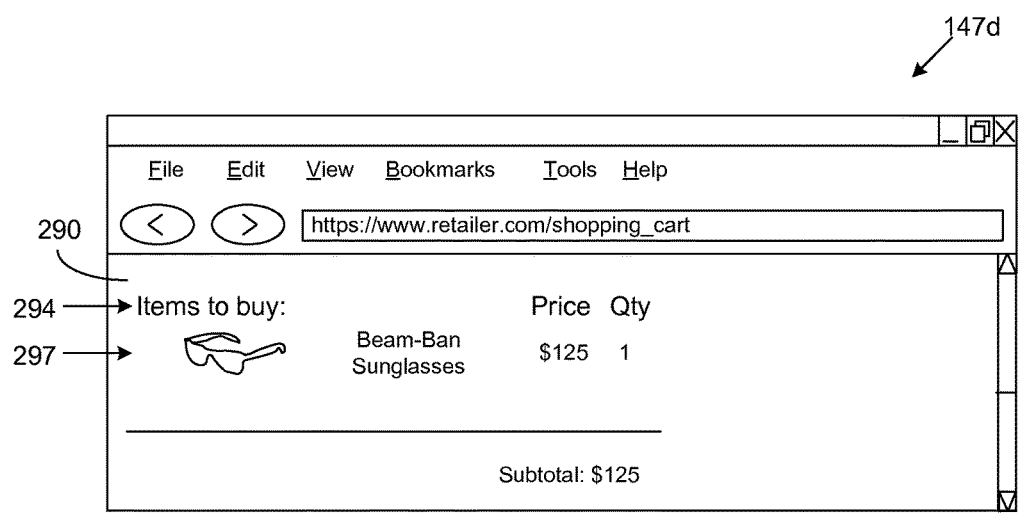

Turning now to FIG. 2E, shown is one example of a user interface 147, denoted herein as user interface 147e, rendered by a client application 141 (FIG. 1) executed in a client 106 (FIG. 1) in the networked environment 100 (FIG. 1) according to one embodiment of the present disclosure. The user interface 147e includes a purchase item network page 290 generated in part by the item recognition application 115 (FIG. 1). The item recognition application 115 has added the Beam-Ban Sunglasses 287 to the user's shopping cart 294 following a user's selection of the sunglasses object indicator 261 (FIG. 2C). This action may have been performed based on the user's historical media viewing actions, a previous selection by the user, retrieved from the media viewing preferences 131 (FIG. 1), or other indication of what action to take upon selection of an item. For example, another indication may be the action selected by the user in the past. For instance, in viewing movies in the past, the user may have chosen to purchase an item related to the object selected. Thus, the item recognition application 115 initiated the item purchase here based on that history. There may be many actions that could be taken and many ways of identifying which action to take upon selection of an object while viewing a media broadcast.

Figure 3A:
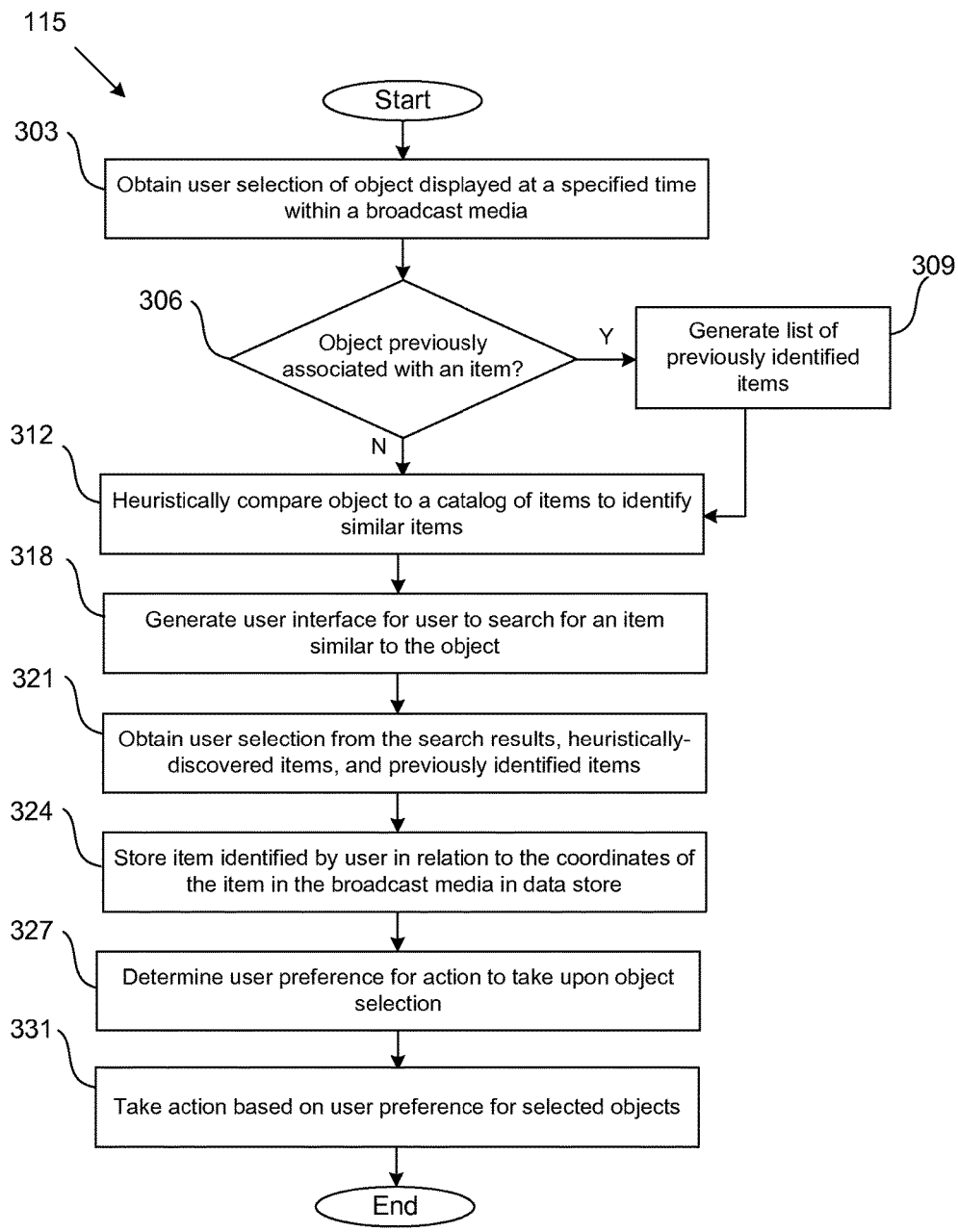
FIGS. 3A and 3B are flowcharts illustrating examples of functionality implemented as portions of an item recognition application 115 executed in a computing environment in the networked environment of FIG. 1 according to various embodiments of the present disclosure.

Referring next to FIG. 3A, shown is a flowchart that provides one example of the operation of a portion of the item recognition application 115 according to various embodiments. It is understood that the flowchart of FIG. 3A provides merely an example of the many different types of functional arrangements that may be employed to implement the operation of the portion of the item recognition application 115 as described herein. As an alternative, the flowchart of FIG. 3A may be viewed as depicting an example of steps of a method implemented in the computing environment 103 (FIG. 1) according to one or more embodiments.

Beginning with box 303, the item recognition application 115 obtains a user selection of an object displayed at a certain time within broadcast media. The selection may have been done by the user clicking on the object using a pointing device 151 (FIG. 1) or in another manner that selects the object. The selection may include coordinates of the click or other input that represent where the object is located in the broadcast media so that the item recognition application 115 recognizes which object was selected. In various embodiments, other indicators may be used for the item recognition application 115 to obtain which object has been selected by the user.

In box 306, the item recognition application 115 evaluates whether the object has been associated with a related item. This may be done by accessing related items 135 (FIG. 1) in the data store 112 (FIG. 1). If items are found, then in box 309, the item recognition application 115 generates a list of these previously identified items.

In box 312, the item recognition application 115 heuristically compares the object to items in an item catalog 124 (FIG. 1) to automatically identify similar items. This may be done by generating Hue, Saturation, Value (HSV) models to compare the detectible characteristics of the object or by using other information discernible from the object in the broadcast media. For example, the item recognition application 115 may determine that a shirt depicted in a movie has a certain HSV model. It may then compare the HSV model to the HSV models of shirts in an item catalog 124 to extract the shirts with the most similar HSV models as being related to the object. The item recognition application 115 may determine an item is similar by selecting those with HSV models within a predetermined threshold.

In box 318, the item recognition application 115 may generate at least a portion of a user interface for the user to manually select items similar to the object. The user may input any criteria relevant to finding items related to the object. For example, the user may suspect that a shirt depicted in a movie is of a certain brand, fabric, or other characteristic important to identifying a related item. The user may search for "Cotton KC teal shirt" to obtain results more likely to be related to the shirt depicted in the movie.

In box 321, the item recognition application 115 obtains a user selection of one item from all of the identified related items, including, but not limited to, the search results from box 318, heuristically-identified items from box 312, and previously identified items from box 309, if applicable. This action may be performed based on a media viewing preference 131 (FIG. 1) that indicates the user seeks to select an item upon selection of an object in broadcast media. Various embodiments may select an item based on, for example, the item most often selected by other users, an item predetermined as related to the object, or other indicators of which item should be selected.

In box 324, the item recognition application 115 stores the item identified by the user as a related item 135 (FIG. 1) and associates the location of the item in the media broadcast with the object at coordinates 134 (FIG. 1). In various embodiments, the item recognition application 115 may store a timestamp to identify the location of the item in the media broadcast. The timestamp may represent, for example, elapsed time since the beginning of the media broadcast. This facilitates future lists of related items, performing other actions with the item, such as, for example, purchase of the item, generation of an item detail page concerning the item, or other action relevant to an item depicted in media broadcasts.

In box 327, the item recognition application 115 determines user preferences for an action to take upon selection of the object indicator. In various embodiments, this may be done heuristically based on past actions taken by the user and/or other users while viewing this media broadcast and/or other media broadcasts. The item recognition application 115 may determine user preferences based on user input or predetermined media viewing preferences 131 (FIG. 1) stored in the data store 112 (FIG. 1). User preferences may include many actions related to observing objects in media and recognizing items related to the objects.

For example, the user may prefer that the media broadcast be paused upon selection of an object. The user may prefer that objects be indicated with highlights when available to be selected. The user may request incentives for providing the input. For example, the user may be part of a rewards program that distributes incentives for providing input to the item recognition application 115. Thus, upon input, the item recognition application 115 may initiate the incentive through the rewards program. In various embodiments, the user may prefer to purchase an item related to the object, view details about an item related to the object, and/or identify an item related to the object upon selection of the object. As a default, the item recognition application 115 may have a default preference that generating a user interface comprising a list of available actions to take upon object selection. There may be many preferences important to item recognition of objects seen in media broadcasts. The item recognition application 115 may take one or many actions upon selection of an object.

In box 331, the item recognition application 115 takes action based on the user preference for selected objects. The item recognition application 115 may perform many actions once an item is recognized. For example, action may involve initiating a purchase of the item. This may be done by adding the item to a shopping list, virtual shopping cart, or simply completing the purchase process where the user has previously input all information necessary for purchases. Various embodiments may take action by obtaining more information about the item and including the information in a user interface to be displayed to the user. In miscellaneous instances, the item recognition application 115 may facilitate interactions concerning the item through social media across the network 109 (FIG. 1) or facilitate user reviews of the item. Thereafter, this portion of the item recognition application ends.

Figure 3B:
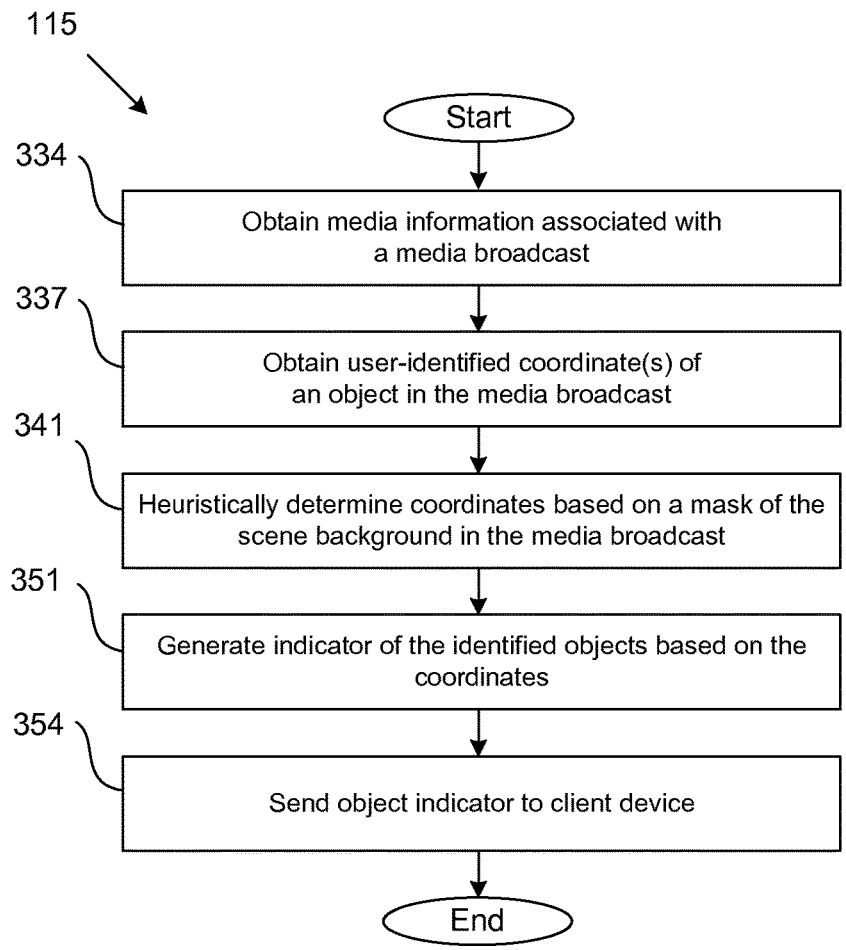

Referring next to FIG. 3B, shown is a flowchart that provides one example of the operation of a portion of the item recognition application 115 according to various embodiments. It is understood that the flowchart of FIG. 3B provides merely an example of the many different types of functional arrangements that may be employed to implement the operation of the portion of the item recognition application 115 as described herein. As an alternative, the flowchart of FIG. 3B may be viewed as depicting an example of steps of a method implemented in the computing environment 103 (FIG. 1) according to one or more embodiments.

Beginning with box 334, the item recognition application 115 obtains media information associated with a media broadcast. A media broadcast may include a music video, movie, television show, video clip, advertisement, electronic magazine, electronic book, or other forms of media broadcasts that include objects with or about which a user may seek to learn more, purchase, or perform other actions. This media information may comprise a title of the media, the timestamp of a frame in the media broadcast being displayed to a user, and other information relevant to identifying items related to objects being displayed in the media broadcast. This information may be stored in detected object 127 (FIG. 1) in the data store 112 (FIG. 1) for future use or presently used to relate items to objects viewed in the media broadcast.

In box 337, the item recognition application 115 obtains user-identified coordinate(s) of objects seen in the media broadcast. The coordinates may represent one point on the object in one frame of the media broadcast, many points on the object in one frame, points on the object in many frames, or other depictions of the object in the media broadcast frame. The coordinates may have been identified in a variety of ways. These ways may include, for example, touching a touch screen device where the object is viewed. Touching the screen for one frame will allow the item recognition application 115 to obtain at least one coordinate associated with a point on the object in the media frame being displayed at the time of the user touch. If the media broadcast is paused, the user may trace the outline of the object to input many coordinates identifying the object in that one frame. If the media broadcast is not paused or continues to play, the user may follow the location of the object in the media broadcast to continue to update the coordinates of the object. The item recognition application 115 may then obtain these coordinates across network 109 (FIG. 1) for use in recognizing items related to the object. The item recognition application 115 may store the coordinates 134 in the data store 112 and/or utilize the coordinates immediately.

Continuing with examples of ways by which the user may identify coordinates of objects in the media broadcast in box 337, the user may point to the location of the object using a pointing device 151 (FIG. 1). A pointing device 151 may be, for example, a mouse, track pad, track ball, or other computer interface device capable of indicating a user input at a specific location on the display 144 (FIG. 1). Functionally, the item recognition application 115 obtains the coordinates pointed to by the pointing device the same as with the touch screen device. There may be many ways for the coordinates to have been identified prior to the item recognition application 115 obtaining the coordinates.

In box 341, the item recognition application 115 masks the scene background in the media broadcast. This may be done by, for example, Canny edge detection around the object. The item recognition application 115 may then create a pixel mask of the background by omitting all pixels around the edges of the object. In various embodiments, a face and skin masking algorithm may be implemented by converting the image into a Hue, Saturation, Value (HSV) model. Once this is done, the item recognition application 115 may apply predetermined thresholds to group H and S parts to identify skin and hair tones. Once hair and skin tones are identified, the item recognition application 115 may create a pixel mask of the hair and skin by omitting the pixels corresponding to those groups. Once the scene around the object has been masked, the item recognition application 115 may heuristically determine the coordinates of the object by evaluating the remaining pixels.

In box 351, the item recognition application 115 generates an indicator of the identified object based on the coordinates obtained in boxes 337 and 341. In various embodiments, the indicators may be used for depicting a flashing outline of the object, dimming the area around the object, changing the color of the object, a line around the object, a shape on and/or around the object, and/or in another way that indicates the object is being highlighted. The indicators may be used to generate highlights as part of the media broadcast, an overlay user interface, an addition to the media stream, and/or other interface with the media broadcast that allows for indicating objects within the media broadcast. For example, if the item recognition application 115 had identified an object with coordinates X and Y, the indicator may be used to generate a white circle at that location in a user interface that overlays the media broadcast when the object is displayed at that location.

In box 354, the item recognition application 115 sends the object indicator to the client device 106 (FIG. 1). In various embodiments, the item recognition application 115 may store the object indicator in the data store 112 (FIG. 1). Thereafter, this portion of the item recognition application ends.

Figure 4:
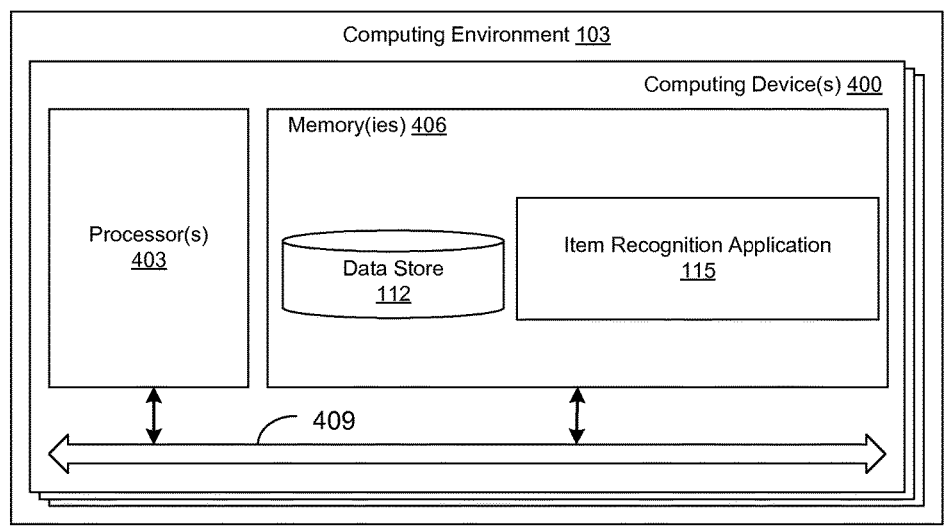
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are item recognition application 115 and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although item recognition application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A and 3B show the functionality and operation of an implementation of portions of the item recognition application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3A and 3B show a specific order of execution, it is understood that the order of execution may differ from that which is depicted. For example, the order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIGS. 3A and 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including item recognition application 115, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed in at least one computing device, causes the at least one computing device to at least:
   obtain at least one coordinate associated with a media frame based on at least one of:
     a user input through a touch screen client device, or
     a user input through a pointing device;
   perform an image recognition on the media frame to identify an object depicted at the at least one coordinate;
   generate an indicator of the object identified in the media frame;
   send the indicator to a client device;
   obtain a user selection of the object; and
   perform an action with respect to an item related to the object in response to the user selection, the action being indicated in at least one of a plurality of media viewing preferences defined with respect to a user;
   wherein the action comprises at least one of:
     initiating a purchase of an item related to the object,
     obtaining a user identified item related to the object,
     automatically identifying an item related to the object,
     generating an item detail page related to the object, or
     performing a search for an item related to the object.

2. The non-transitory computer-readable medium of claim 1, wherein the indicator is based at least in part on an overlay user interface on top of the media frame.

3. The non-transitory computer-readable medium of claim 1, wherein the program further causes the at least one computing device to at least obtain the at least one of a plurality of media viewing preferences.

4. A system, comprising:
   at least one computing device; and
   a memory device comprising an item detection executable, the item detection executable, when executed by the at least one computing device, causing the at least one computing device to at least:
     obtain a coordinate in a media frame corresponding to a location of an object depicted in the media frame, the coordinate being based at least in part on a user input;
     perform an image recognition analysis of the media frame to detect an object depicted proximate to the coordinate;
     generate an indicator of the object in the location as depicted in the media frame;
     obtain a user selection of the object at the location identified by the indicator; and
     perform, in response to the user selection, an action with respect to an item related to the object, the action being indicated in at least one of a plurality of media viewing preferences defined with respect to a user.

5. The system of claim 4, wherein the item detection executable further causes the at least one computing device to at least define the plurality of media viewing preferences based on at least one of a plurality of user inputs.

6. The system of claim 4, wherein the item detection executable further causes the at least one computing device to at least define the plurality of media viewing preferences based on an analysis of a media viewing history associated with the user.

7. The system of claim 4, wherein the location of the object is identified based on at least one of a timestamp, a user identified coordinate or a masking algorithm.

8. The system of claim 4, wherein the indicator comprises an overlay user interface.

9. The system of claim 4, wherein the indicator comprises an addition to the media frame.

10. The system of claim 4, wherein the indicator comprises the location of the object.

11. The system of claim 4, wherein the action comprises receiving a user selection of an item related to the object.

12. The system of claim 4, wherein the action comprises adding the item related to the object corresponding to the user selection to a list.

13. The system of claim 12, wherein the list comprises a shopping cart list.

14. The system of claim 12, wherein the list comprises a wish list.

15. The system of claim 7, wherein the masking algorithm identifies the coordinates based at least in part on a background mask.

16. The system of claim 4, wherein the action further comprises changing a viewing speed of a media broadcast.

17. The system of claim 4, wherein the action comprises generating an item detail page associated with the item related to the object corresponding to the user selection.

18. The system of claim 4, wherein the action further comprises initiating an incentive to a user providing input.

19. The system of claim 4, wherein at least one of the media viewing preferences indicates whether to pause a media broadcast in response to the user selection.

20. A method, comprising:
   obtaining, in a computing device, a plurality of coordinates associated with an object depicted in a media frame;
   perform an image recognition on the media frame to detect the object based at least in part on the plurality of coordinates;
   generating, in the computing device, an indicator of the object at the coordinates;
   obtaining, in the computing device, a user selection of the object; and performing an action with respect to an item related to the object, the action being indicated in a plurality of media viewing preferences defined with respect to a user.

21. The method of claim 20, wherein the coordinates are based at least in part on at least one user input through a touchscreen on the computing device.

22. The method of claim 20, wherein the coordinates are based at least in part on at least one user input through a pointing device associated with the computing device.

23. The method of claim 20, wherein the coordinates are based at least in part on a masking algorithm.

24. The method of claim 23, wherein the masking algorithm identifies the coordinates based at least in part on a background mask.

25. The method of claim 24, wherein the background mask is based at least in part on a Canny edge detection algorithm to the media frame.

26. The method of claim 23, wherein the masking algorithm identifies the coordinates based at least in part on a human feature mask.

27. The method of claim 26, wherein the human feature mask is based at least in part on a Hue, Saturation, Value model to the media frame.

28. The method of claim 20, wherein the action comprises at least one of an adding the item related to the object to a list, a generation of a user interface of an item detail page associated with the item related to the object, changing viewing speed of a media broadcast, initiating an incentive for a user providing input, or a generation of a user interface of a plurality of potential actions from which the user may dynamically select.

* * * * *